United States Patent
Hu et al.

(10) Patent No.: US 11,922,147 B2
(45) Date of Patent: Mar. 5, 2024

(54) NETWORK BASED APPLIANCE CONTROLLER SYSTEM AND METHOD

(71) Applicant: Haier US Appliance Solutions, Inc., Wilmington, DE (US)

(72) Inventors: Haitian Hu, Louisville, KY (US); Hairong Li, Louisville, KY (US); John Ouseph, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 49 days.

(21) Appl. No.: 17/728,228

(22) Filed: Apr. 25, 2022

(65) Prior Publication Data

US 2023/0342120 A1 Oct. 26, 2023

(51) Int. Cl.
*G06F 8/38* (2018.01)
(52) U.S. Cl.
CPC ...................................... *G06F 8/38* (2013.01)
(58) Field of Classification Search
CPC .......................................................... G06F 8/38
See application file for complete search history.

(56) References Cited

U.S. PATENT DOCUMENTS

| | | | | |
|---|---|---|---|---|
| 6,873,876 | B1 * | 3/2005 | Aisa | G05B 19/042 219/745 |
| 8,266,578 | B2 * | 9/2012 | Bazigos | G06F 8/20 717/122 |
| 9,961,160 | B2 | 5/2018 | Park et al. | |
| 2008/0156032 | A1 * | 7/2008 | Cur | F25B 25/005 62/157 |
| 2009/0249283 | A1 * | 10/2009 | Bourdon | G06F 8/61 717/104 |
| 2013/0030552 | A1 | 1/2013 | Beckley et al. | |
| 2014/0345474 | A1 | 11/2014 | Rocha et al. | |
| 2022/0417052 | A1 * | 12/2022 | Kong | H04L 12/2814 |

FOREIGN PATENT DOCUMENTS

| | | | | |
|---|---|---|---|---|
| CN | 107357618 A | | 11/2017 | |
| CN | 111766795 A | * | 10/2020 | |
| CN | 114381903 A | * | 4/2022 | ............. D06F 34/05 |
| EP | 3985155 A1 | * | 4/2022 | ............. D06F 34/05 |
| WO | WO-0019284 A1 | * | 4/2000 | ........... G05B 19/042 |
| WO | WO-2008006671 A1 | * | 1/2008 | ........... D06F 39/005 |
| WO | WO-2012171871 A1 | * | 12/2012 | ......... G05B 19/0426 |

* cited by examiner

*Primary Examiner* — Phillip H Nguyen
(74) *Attorney, Agent, or Firm* — Dority & Manning, P.A.

(57) ABSTRACT

A system and method for user interface development and appliance data transmission is provided. The method includes generating, at a controller at an appliance, a core control module configured to perform operations corresponding to a first operating function at the appliance; obtaining, at a network computing device, a user input corresponding to a second operating function; building, at the network computing device, a user-specific control module comprising the second operating function; transmitting, to the controller at the appliance, the user-specific control module; and combining the user-specific control module to the core control module.

20 Claims, 4 Drawing Sheets

NETWORK BASED APPLIANCE CONTROLLER SYSTEM AND METHOD

FIELD OF THE INVENTION

The present subject matter relates generally to consumer or commercial appliances, such as domestic appliances, and more particularly to systems and methods for generating and altering control modules for appliances.

BACKGROUND OF THE INVENTION

Conventional residential or commercial appliances may include a standardized control system for an appliance. A manufacturer may generally include several classes of customer profiles and broad types of specialized products for each customer profile. Further customization increases complexity in the manufacturing process, which in turn increases manufacturing cost that may be prohibitive to implement at the appliance and utilize by an end-user.

End users, such as customers, generally desire specialization or customization for their specific, and generally unique, appliance use case. Standardized control systems at the appliance may inhibit or prevent the user from having specialized controls. Standardized control systems may further prevent changing or upgrading physical components or functionalities at the appliance without also changing the controller.

Accordingly, systems and methods allowing for specialization or customization of control systems at an appliance are desired.

BRIEF DESCRIPTION OF THE INVENTION

Aspects and advantages of the invention will be set forth in part in the following description, or may be obvious from the description, or may be learned through practice of the invention.

An aspect of the present disclosure is directed to a computer-implemented method for user interface development. The method includes generating, at a controller at an appliance, a core control module configured to perform operations corresponding to a first operating function at the appliance; obtaining, at a network computing device, a user input corresponding to a second operating function; building, at the network computing device, a user-specific control module comprising the second operating function; transmitting, to the controller at the appliance, the user-specific control module; and combining the user-specific control module to the core control module.

Another aspect of the present disclosure is directed to an appliance data transmission system. The system includes an appliance including a controller operably connected to a network computing device. The controller is configured to receive a core control module configured to perform operations corresponding to a first operating function at the appliance. The network computing device is configured to obtain a user input corresponding to a second operating function, build a user-specific control module comprising the second operating function, and transmit, to the controller at the appliance, the user-specific control module. The controller is configured to obtain a combined user-specific control module and core control module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
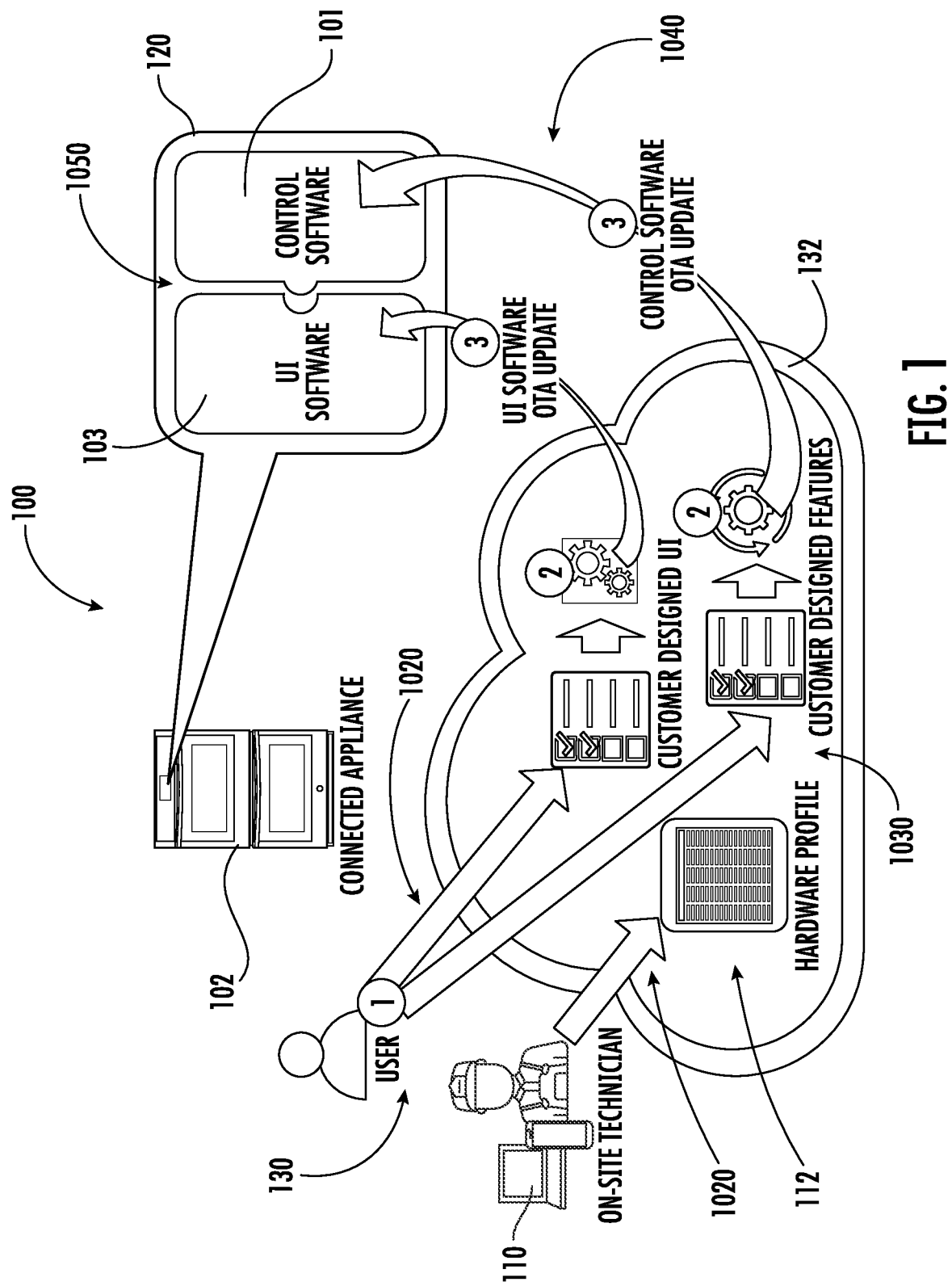
FIG. 1 provides a schematic diagram depicting a system executing steps of a method for data and user-interface development for an appliance in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
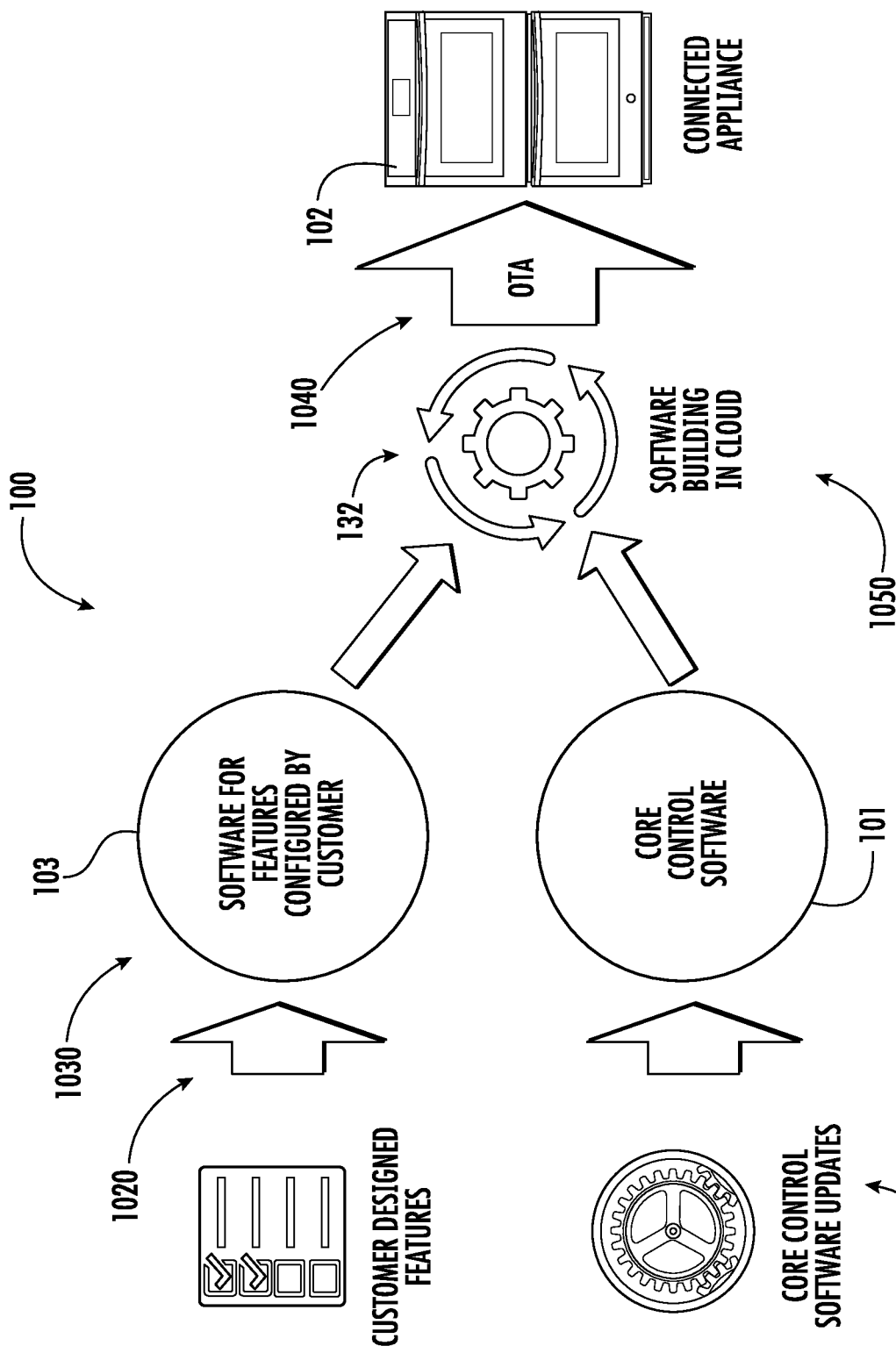
FIG. 2 provides a schematic diagram depicting a system executing steps of a method for data and user-interface development for an appliance in accordance with aspects of the present disclosure.
Figure 3:
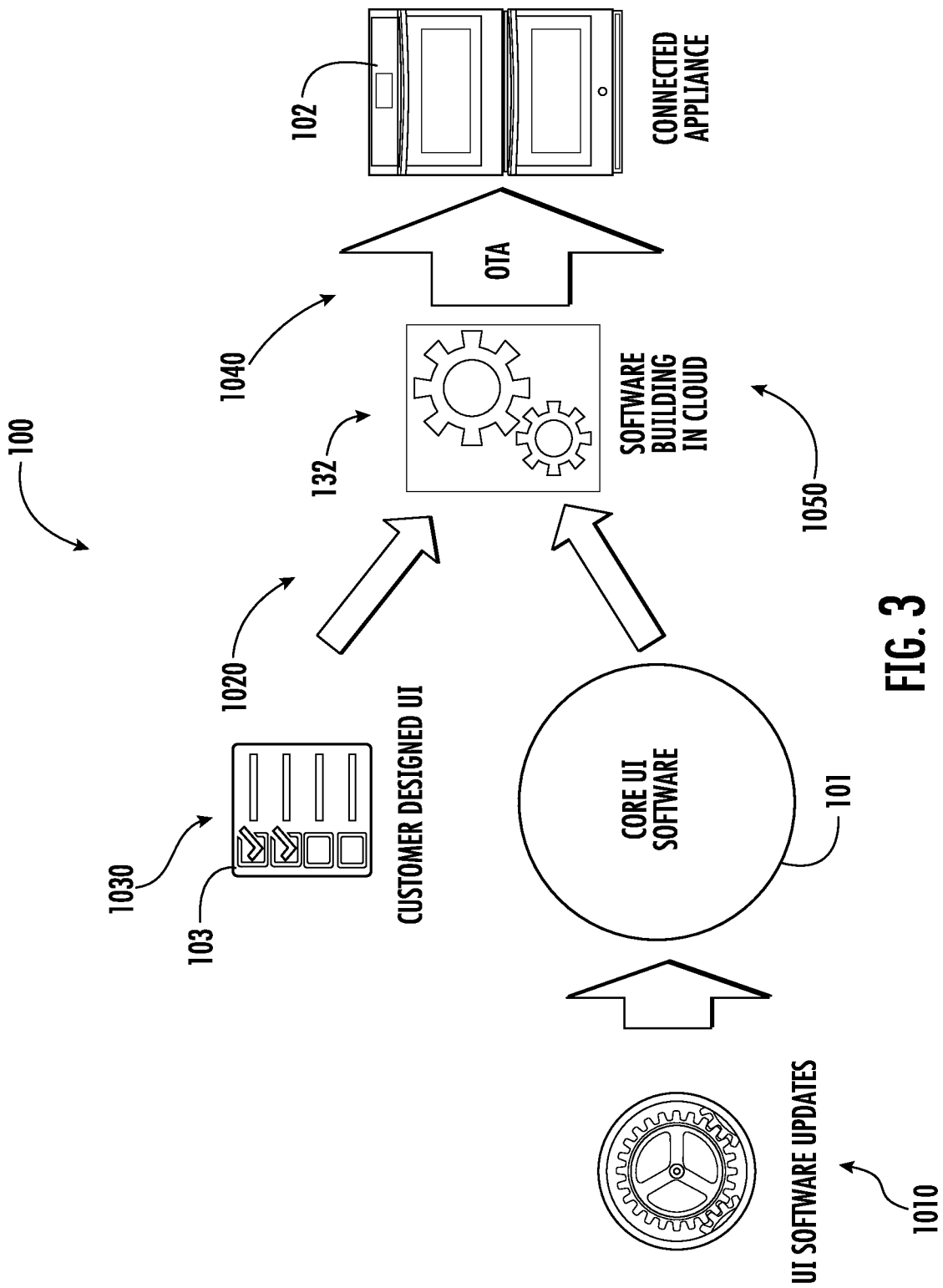
FIG. 3 provides a schematic diagram depicting a system executing steps of a method for data and user-interface development for an appliance in accordance with aspects of the present disclosure.

Referring now to FIGS. 1-3, embodiments of an appliance data transmission system 100 will be described in accordance with exemplary embodiments of the present subject matter. In general, system 100 may include any suitable number, type, and configuration of appliances, remote servers, network devices, and/or other external devices. System 100 may include a plurality of appliances 102 and may be able to communicate with each other or are otherwise interconnected. This interconnection, interlinking, and interoperability of multiple appliances and/or devices may commonly be referred to as "smart home" or "connected home" appliance interconnectivity.

FIGS. 1-3 illustrate an appliance data transmission system 100 according to exemplary embodiments of the present subject matter. As shown, system 100 generally includes an appliance 102. Details regarding the operation of the appliance 102 may be understood by one having ordinary skill in the art and detailed discussion is omitted herein for brevity. However, it should be appreciated that the specific appliance types and configurations are only exemplary and are provided to facilitate discussion regarding the use and operation of an exemplary system 100. The scope of the present subject matter is not limited to the number, type, and configurations of appliances set forth herein.

For example, system 100 may include any suitable number and type of appliances 102, such as "household appliances." These terms are used herein to describe appliances typically used or intended for common domestic tasks, e.g., such as the appliances as illustrated in the figures. According to still other embodiments, these "appliances" may include but are not limited to a refrigerator, a dishwasher, a microwave oven, a cooktop, an oven, a washing machine, a dryer, a water heater, a water filter or purifier, an air conditioner, a space heater, and any other household appliance which performs similar functions. Moreover, although only three appliances are illustrated, various embodiments of the present subject matter may also include another number of appliances, each of which may generate and store data.

In addition, it should be appreciated that system 100 may include one or more external devices, e.g., devices that are separate from or external to the one or more appliances, and which may be configured for facilitating communications with various appliances or other devices. For example, the system 100 may include or be communicatively coupled with a remote user interface device 110 that may be configured to allow user interaction with some or all appliances or other devices in the system 100.

In general, remote user interface device 110 may be any suitable device separate and apart from appliance 102 that is configured to provide and/or receive communications, information, data, or commands from a user. In this regard, remote user interface device 110 may be an additional user interface to the user interface panels of the various appliances within the system 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the remote user interface device 110 be provided as a smartphone app.

As will be described in more detail below, some or all of the system 100 may include or be communicatively coupled with a remote server 112 that may be in operative communication with some or all appliances 102 within system 100. Thus, user interface device 110 and/or remote server 112 may refer to one or more devices that are not considered household appliances as used herein. In addition, devices such as a personal computer, router, network devices, and other similar devices whose primary functions are network communication and/or data processing are not considered household appliances as used herein.

As illustrated, appliance 102, remote user interface device 110, or any other devices or appliances in system 100 may include or be operably coupled to a controller, identified herein generally by reference numeral 120. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is additionally, or alternatively, configured to store, execute, or otherwise operate or perform any one or more methods, method steps, or portions of methods as disclosed herein. For example, in some embodiments, methods disclosed herein may be embodied in programming instructions stored in the memory and executed by controller 120. The memory devices may also store data that can be retrieved, manipulated, created, or stored by the one or more processors or portions of controller 120. One or more database(s) can be connected to controller 120 through any suitable communication module, communication lines, or network(s).

Referring still to FIGS. 1-3, a schematic diagram of an external communication system 130 will be described according to an exemplary embodiment of the present subject matter. In general, external communication system 130 is configured for permitting interaction, data transfer, and other communications between and among the appliance 102, remote user interface device 110, and the remote server 112. For example, this communication may be used to transmit packets of data through a network 132 and to the remote server 112 and to receive at one or more appliances a user input corresponding to a desired appliance function, including, but not limited to, user interface selections, primary or secondary function selections, functions associated with an operational parameter adjustment corresponding to one or more of operating parameters, cycle settings, user instructions or notifications, performance characteristics, user preferences, or any other suitable information for improved performance of one or more appliances within system 100.

In addition, remote server 112 may be in communication with an appliance and/or remote user interface device 110 through the network 132. In this regard, for example, remote server 112 may be a cloud-based server 112, and is thus located at a distant location, such as in a separate state, country, etc. According to an exemplary embodiment, remote user interface device 110 may communicate with a remote server 112 over network 132, such as the Internet, to transmit/receive data packets or information, provide user inputs, receive user notifications or instructions, interact with or control the appliance, etc. In addition, remote user interface device 110 and remote server 112 may communicate with the appliance to communicate similar information.

In general, communication between an appliance, remote user interface device 110, remote server 112, and/or other user devices or appliances may be carried using any type of wired or wireless connection and using any suitable type of communication network, non-limiting examples of which are provided below. For example, remote user interface device 110 may be in direct or indirect communication with the appliance through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 130 is described herein according to an exemplary embodiment of the present subject matter. However, it should be appreciated that the exemplary functions and configurations of external communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Now that the construction of system 100 and external communication system 130 have been presented according to exemplary embodiments, an exemplary method 1000 for data transmission for an appliance will be described. Although the discussion below refers to the exemplary method 1000 data transmission, over-the-air (OTA) data transmission, and user-interface development for any appropriate type of appliance, one skilled in the art will appreciate that the exemplary method 1000 is applicable to control function and the memory usage and/or data allocation of any suitable number, type, and configuration of appliances. In exemplary embodiments, the various method steps as disclosed herein may be performed by one or more controllers (e.g., such as controllers 120), one or more remote servers 112, or processes may occur at the remote server 112 or distributed across network computing devices interconnected in accordance with a network 132 such as described herein.

Figure 4:
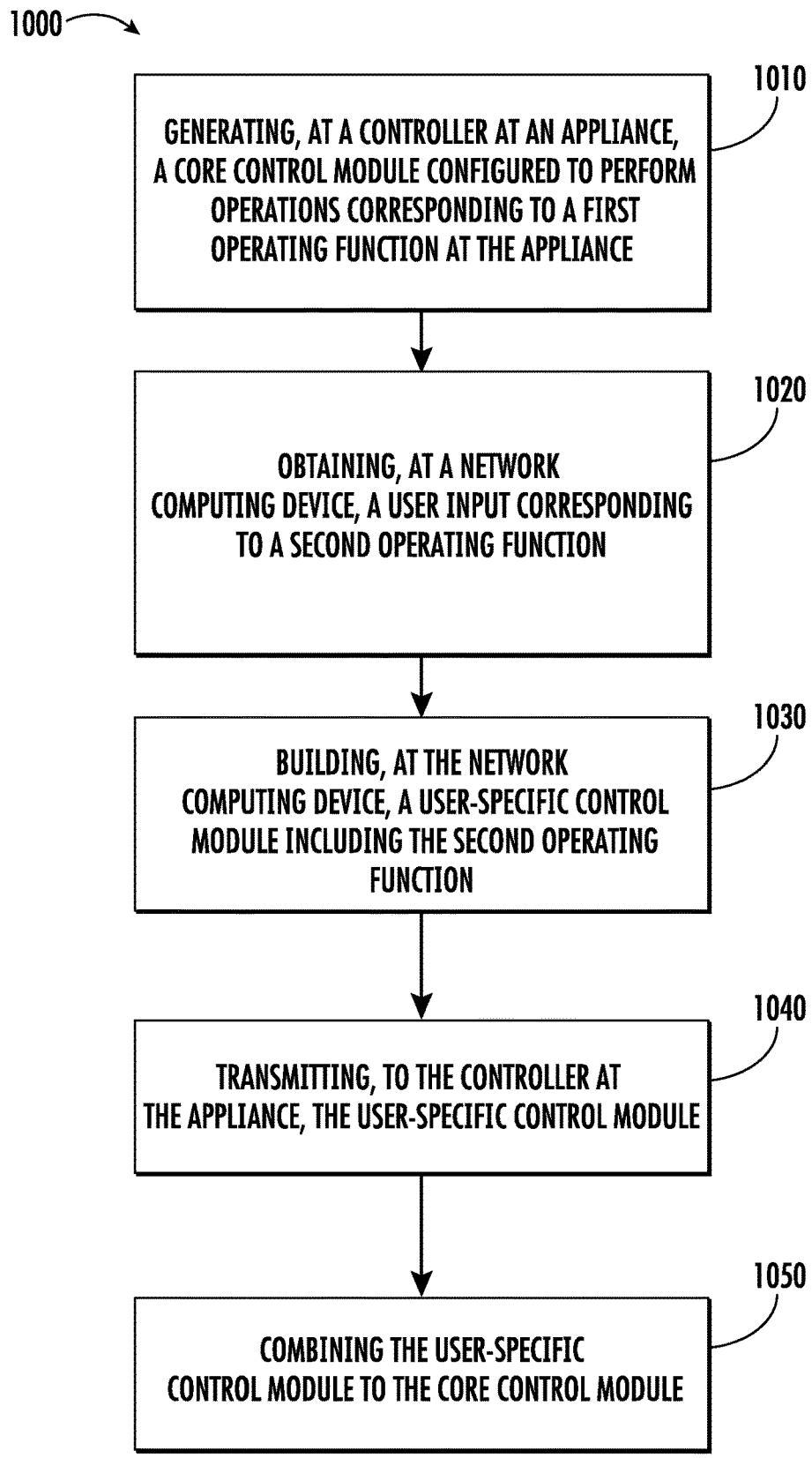
FIG. 4 provides a flowchart outlining steps of a method for data and user-interface development for an appliance in accordance with aspects of the present disclosure.

Referring now to FIG. 4, embodiments of a method for data transmission and software alteration for an appliance are provided (hereinafter, "method 1000"). Steps of the method may be stored as instructions or executed as operations by controller 120 at any one or more appliances such as described herein. However, it should be appreciated that embodiments of the method may be stored or performed at other appliances and networks without deviating from the scope of the subject matter.

Embodiments of the method 1000 include at 1010 generating or receiving, at a controller at an appliance, a core control module configured to perform operations corresponding to a first operating function at the appliance and at 1020 obtaining, at a network computing device, a user input corresponding to a second operating function.

The core control module may generally include software, firmware, or other control algorithms configured to perform or execute operations considered primary to the appliance function. For instance, the first operating function may include chilling and freezing at a refrigeration appliance, or generating heat at an oven or cooktop appliance, or various wash cycles at a dishwasher appliance or laundry washing appliance, or various drying cycles at a dryer appliance, or inputting cook times and cook power levels at a microwave appliance and generating energy accordingly, etc.

In contrast, the second operating function may include any plurality of functions considered ancillary or secondary to the appliance. For instance, the second operating function may include icemaking or water dispensing at the refrigeration appliance, an air frying function at a stove or cooktop appliance, or a user interface preference or layout. In a particular embodiment, the second operating function includes one or more user interface layouts as desired by a user. Such user interface layout may include coloring schemes, app layout, user modules, apps, or other user-specific preferences at a touchscreen user interface panel.

Method 1000 includes at 1030 building, at the network computing device, a user-specific control module including the second operating function. Method 1000 includes at 1040 transmitting, to the controller at the appliance, the user-specific control module. In certain embodiments, method 1000 at 1040 includes at transmitting, to the appliance via the network computing device, a control signal corresponding to activating the second operating function at the appliance. In a particular embodiment, the control signal corresponds to activating the hardware profile at the appliance includes unlocking the second operating function at the appliance.

Method 1000 includes at 1050 combining the user-specific control module to the core control module. In certain embodiments, method 1000 at 1050 is performed at the controller, such as depicted at FIG. 1. In still certain embodiments, method 1000 at 1050 is performed at the network computing device, such as depicted at FIGS. 2-3.

In particular embodiments, method 1000 includes first building the core control module, such as at step 1010. A technician, manufacturer, or other user may perform step 1010 and transmit to the controller 120 at appliance 102. The user, or another user (e.g., end-user of appliance) may then select, provide, or otherwise generate second operating functions, such as at step 1020, such as additional operating features or user-interface details or preferences. The core control module includes primary operating functions provides basic operating functions for the appliance, as may be defined by the manufacturer or distributor. The core control module additionally includes a platform at which second control functions may be added, such as at step 1030.

In certain embodiments, method 1000 includes at 1022 generating, at the network computing device, a personality table based on receiving a plurality of user inputs corresponding to respective second operating functions. Method 1000 at 1022 may include storing, at the network 132 or remote server 112, the personality table as a dataset corresponding to user preferences, details, or other selections received from the user (e.g., at step 1020) corresponding to the second operating function. The dataset may form a cloud personality table (FIGS. 1-3) at which additional features or changes corresponding to the user are retained. Cloud personality table may include, but not limited to, second operating functions, such as user interface layout, touchscreen locations, default preferences, etc.

Second operating functions corresponding to the user inputs at 1020 are built at the network 132 or remote server 112 (e.g., step 1030). In certain embodiments, a complete control module including first and second operating functions is compiled at the network 132 or remote server 112, such as provided at 1050, and transmitted to the controller 120, such as provided at 1040 and depicted FIGS. 2-3. In still certain embodiments, the first and second operating functions are built and transmitted to the controller 120, such as provided at 1040, and compiled at the controller 120, such as provided at 1050 and depicted at FIG. 1.

FIGS. 2-3 further depict operation in which a technician or other user may perform hardware changes, upgrades, replacements, or other configuration changes at the appliance 102 and generate the core control module at 1010 or provide user inputs corresponding to the second operating function at 1020. As provided above, method 1000 at 1040 may include transmitting, to the appliance via the network computing device, a control signal corresponding to activating the second operating function at the appliance. In a particular embodiment, the control signal corresponds to activating the hardware profile (e.g., the hardware profile corresponding to technician or other user hardware changes) at the appliance includes unlocking the second operating function at the appliance.

Certain embodiments of method 1000 include at 1044 adjusting, at the network computing device, a hardware profile identifying an activation state of the second operating functions at the appliance. In various embodiments, the activation state includes a locked or unlocked state. The locked state disables corresponding secondary functions at the appliance and the unlocked state allows corresponding secondary functions at the appliance to be performed.

For instance, a refrigeration appliance may include refrigeration as a primary operating function and icemaking as a secondary operating function, or clear icemaking (i.e., low or no total dissolved solids) as the secondary operating function, or connectivity, touchscreen, or user interface modules as the secondary operating function.

In another instance, a cooking appliance, such as a stove or microwave, may include certain cooking methods as the primary operating function and other cooking methods as the secondary operating function. Still further, user-desired cooking times, procedures, power settings, cycles, modulations, etc. may be included as the secondary operating function.

In still other embodiments, the first operating function corresponds to temperature control, fluid control, motor control, actuator control, or combinations thereof at the appliance. The second operating function may correspond to a visual output at the appliance, another temperature, fluid, motor, or actuator control, or combinations thereof.

Embodiments of the system 100 and method 1000 provided herein allow a user to select and build which features to download and configure, such as provided at 1030, prior to building a modified control module including the user-specific control module with corresponding second control functions and the core control module with corresponding primary control functions, such as provided at 1050. The modified control module is transmitted to the appliance over-the-air, such as depicted at certain embodiments at 1040. Accordingly, the user determines which features should be unlocked, allowed, customized, or more prominently displayed at the user interface, and how such features are displayed or executed. A technician or another user may implement physical hardware upgrades at the appliance and update a corresponding hardware profile of the appliance. The user may correspondingly unlock additional features in accordance with steps of method 1000 provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for user interface development, the method comprising:
   generating, at a controller at an appliance, a core control module configured to perform operations corresponding to a first operating function at the appliance;
   obtaining, at a network computing device, a user input corresponding to a second operating function;
   building, at the network computing device, a user-specific control module comprising the second operating function;
   transmitting, to the controller at the appliance, the user-specific control module; and combining the user-specific control module to the core control module.

2. The method of claim 1, the method comprising:
generating, at the network computing device, a personality table based on receiving a plurality of user inputs corresponding to respective second operating functions.

3. The method of claim 1, the method comprising:
transmitting, to the appliance via the network computing device, a control signal corresponding to activating the second operating function at the appliance.

4. The method of claim 3, the control signal corresponding to activating a hardware profile at the appliance includes unlocking the second operating function at the appliance.

5. The method of claim 3, the method comprising:
adjusting, at the network computing device, a hardware profile identifying an activation state of the second operating functions at the appliance.

6. The method of claim 5, wherein the activation state comprises a locked or unlocked state, wherein the locked state disables corresponding second functions at the appliance, and wherein the unlocked state allows corresponding second functions at the appliance.

7. The method of claim 1, wherein combining the user-specific control module to the core control module comprises combining, at the network computing device, the user-specific control module to the core control module.

8. The method of claim 1, wherein combining the user-specific control module to the core control module comprises combining, at the controller, the user-specific control module to the core control module.

9. The method of claim 1, wherein the first operating function corresponds to temperature control, fluid control, motor control, actuator control, or combinations thereof at the appliance.

10. The method of claim 9, wherein the second operating function corresponds to a visual output at the appliance.

11. An appliance data transmission system, the system comprising:
an appliance comprising a controller operably connected to a network computing device, the controller configured to receive a core control module configured to perform operations corresponding to a first operating function at the appliance,
wherein the network computing device is configured to obtain a user input corresponding to a second operating function, build a user-specific control module comprising the second operating function, and transmit, to the controller at the appliance, the user-specific control module,
and wherein the controller is configured to obtain a combined user-specific control module and core control module.

12. The system of claim 11, wherein the network computing device is configured to generate a personality table based on receiving a plurality of user inputs corresponding to respective second operating functions.

13. The system of claim 11, wherein the network computing device is configured to transmit, to the appliance, a control signal corresponding to activating the second operating function at the appliance.

14. The system of claim 13, wherein the control signal corresponds to activating a hardware profile at the appliance includes unlocking the second operating function at the appliance.

15. The system of claim 13, wherein the network computing device is configured to adjust a hardware profile identifying an activation state of the second operating functions at the appliance.

16. The system of claim 15, wherein the activation state comprises a locked or unlocked state, wherein the locked state disables corresponding second functions at the appliance, and wherein the unlocked state allows corresponding second functions at the appliance.

17. The system of claim 11, wherein the network computing device is configured to combine the user-specific control module to the core control module.

18. The system of claim 11, wherein the controller is configured to combine the user-specific control module to the core control module.

19. The system of claim 11, wherein the first operating function corresponds to temperature control, fluid control, motor control, actuator control, or combinations thereof at the appliance.

20. The system of claim 19, wherein the second operating function corresponds to a visual output at the appliance.

* * * * *